(12) United States Patent
Araki

(10) Patent No.: US 9,952,849 B2
(45) Date of Patent: Apr. 24, 2018

(54) APPARATUS, INFORMATION PROCESSING SYSTEM, METHOD FOR PROCESSING INFORMATION, AND PROGRAM

(71) Applicant: Ryoji Araki, Fukuoka (JP)

(72) Inventor: Ryoji Araki, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/370,055

(22) Filed: Dec. 6, 2016

(65) Prior Publication Data

US 2017/0161048 A1 Jun. 8, 2017

(30) Foreign Application Priority Data

Dec. 8, 2015 (JP) .................................. 2015-239024

(51) Int. Cl.
 G06F 9/445 (2006.01)
(52) U.S. Cl.
 CPC . G06F 8/61 (2013.01); G06F 8/62 (2013.01)
(58) Field of Classification Search
 None
 See application file for complete search history.

(56) References Cited

U.S. PATENT DOCUMENTS

| 8,264,717 | B2 | 9/2012 | Araki |
| 8,474,051 | B2 | 6/2013 | Araki |
| 8,488,135 | B2 | 7/2013 | Shimizu et al. |
| 8,982,386 | B2 | 3/2015 | Araki |
| 9,218,224 | B2 | 12/2015 | Araki |
| 9,261,947 | B2 | 2/2016 | Araki |
| 9,286,048 | B2 | 3/2016 | Araki |
| 9,286,141 | B2 | 3/2016 | Araki |
| 9,307,108 | B2 | 4/2016 | Araki |
| 9,323,478 | B2 | 4/2016 | Araki |
| 2007/0086022 | A1* | 4/2007 | Kumagai ............ G06F 11/1451 358/1.1 |
| 2008/0088867 | A1* | 4/2008 | Ikeda ................. H04N 1/00222 358/1.13 |
| 2011/0261395 | A1* | 10/2011 | Kim ....................... G06F 9/445 358/1.15 |
| 2013/0128313 | A1* | 5/2013 | Hirokawa .......... H04N 1/00965 358/1.16 |
| 2014/0129607 | A1 | 5/2014 | Nagumo |
| 2015/0128231 | A1 | 5/2015 | Nakajima |
| 2016/0014113 | A1 | 1/2016 | Akiyoshi et al. |

(Continued)

FOREIGN PATENT DOCUMENTS

| JP | 2010-218456 | 9/2010 |
| JP | 2014-095986 | 5/2014 |
| JP | 2015-111415 | 6/2015 |

*Primary Examiner* — Philip Wang
(74) *Attorney, Agent, or Firm* — IPUSA, PLLC

(57) ABSTRACT

An apparatus includes an installing unit configured to acquire a program from an information processing apparatus coupled to a network and install the acquired program on the apparatus, an acquiring unit configured to acquire setup information applied to the apparatus at an installing destination, to which the program is installed, the acquiring unit acquiring first setup information sent to the information processing apparatus from the apparatus or another apparatus before installing the program, and an applying unit configured to apply the first setup information to the apparatus in response to installing of the program.

15 Claims, 13 Drawing Sheets

(56) References Cited

U.S. PATENT DOCUMENTS

| | | |
|---|---|---|
| 2016/0044200 A1 | 2/2016 | Araki et al. |
| 2016/0065756 A1 | 3/2016 | Araki et al. |
| 2016/0205277 A1 | 7/2016 | Araki |
| 2016/0275282 A1 | 9/2016 | Araki |

\* cited by examiner

FIG. 7

```
APP ID: APP A
    APP SETUP
        SENDING DESTINATION MAIL ADDRESS    SETUP UNIQUE TO APP
    APPARATUS SETUP
        PRIORITIZED APP SETUP: APP A        EXCLUSION
        HEAP SIZE: 32 MB                    COMBINATION
```

FIG. 8

| VERSION INFORMATION | SETUP ITEM NAME | SETUP VALUE | ... | EXCLUSION | COMBINATION |
|---|---|---|---|---|---|
| APP A (VENDOR RECOMMENDED VALUE) | PRIORITIZED APP SETUP | APP A | ... | ○ | |
| | HEAP SIZE | 32 MB | | | ○ |
| | | | | | |
| | | | | | |
| | | | | | |
| | | | | | |

APP ID: APP B
APP SETUP
 SENDING DESTINATION MAIL ADDRESS
 SETUP UNIQUE TO APP
APPARATUS SETUP
 PRIORITIZED APP SETUP: APP B    EXCLUSION
 HEAP SIZE: 16 MB                COMBINATION

FIG.10

| VERSION INFORMATION | SETUP ITEM NAME | SETUP VALUE | EXCLUSION | COMBINATION |
|---|---|---|---|---|
| .. | .. | .. | .. | .. |
| APP A (VENDOR RECOMMENDED VALUE) | PRIORITIZED APP SETUP | APP A | ○ | |
| | HEAP SIZE | 32 MB | | ○ |
| APP B (VENDOR RECOMMENDED VALUE) | PRIORITIZED APP SETUP | APP B | ○ | |
| | HEAP SIZE | 16 MB | | ○ |
| | | | | |

FIG.12

| SETUP ITEM NAME | SETUP VALUE | WHETHER SETUP IS POSSIBLE | WHETHER IT IS NECESSARY TO BE UNIQUE TO APPARATUS | EXCLUSION | COMBINATION |
|---|---|---|---|---|---|
| CLOCK TIMER SETUP - SLEEP MODE TRANSITION TIME SETUP | 60 SECONDS | POSSIBLE | - | | |
| INTERFACE SETUP - VALID PROTOCOL IPv4 | VALID | POSSIBLE | - | ○ | |
| INTERFACE SETUP - VALID PROTOCOL IPv6 | INVALID | POSSIBLE | - | ○ | |
| INTERFACE SETUP - DOMAIN NAME | Domain | IMPOSSIBLE | - | ○ | |
| PAPER SETUP - TRAY PAPER SIZE SETUP | A4 | IMPOSSIBLE | - | | |
| PAPER SIZE SETUP - AUTOMATIC DETECTION | AUTOMATIC | IMPOSSIBLE | - | | |
| INTERFACE SETUP - IP ADDRESS | 111.222.333.444 | POSSIBLE | UNIQUE | ○ | |
| INTERFACE SETUP - SUBNET MASK | 255.255.255.0 | POSSIBLE | UNIQUE | ○ | |
| INTERFACE SETUP - HOST NAME | host | POSSIBLE | UNIQUE | ○ | |
| SYSTEM SETUP - PRIORITIZED APP SETUP | APP C | POSSIBLE | - | | ○ |
| SYSTEM SETUP - HEAP SIZE | 16 MB | POSSIBLE | - | | |
| ... | ... | ... | ... | ... | ... |

| VERSION INFORMATION | SETUP ITEM NAME | SETUP VALUE | EXCLUSION | COMBINATION |
|---|---|---|---|---|
| .. | .. | .. | .. | .. |
| APP A (VENDOR RECOMMENDED VALUE) | PRIORITIZED APP SETUP | APP A | ○ | |
| | HEAP SIZE | 32 MB | | ○ |
| APP B (VENDOR RECOMMENDED VALUE) | PRIORITIZED APP SETUP | APP B | ○ | |
| | HEAP SIZE | 16 MB | | ○ |
| APPARATUS a (MACHINE TYPE A) /APP C | PRIORITIZED APP SETUP | APP C | ○ | .. |
| | HEAP SIZE | 16 MB | | ○ |
| | | | | |

333

APPARATUS, INFORMATION PROCESSING SYSTEM, METHOD FOR PROCESSING INFORMATION, AND PROGRAM

CROSS-REFERENCE TO RELATED APPLICATIONS

The present application claims priority under 35 U.S.C. § 119 to Japanese Patent Application No. 2015-239024 filed Dec. 8, 2015. The contents of which are incorporated herein by reference in their entirety.

BACKGROUND OF THE INVENTION

Field of the Invention

The present invention relates to an apparatus, an information processing system, a method for processing information, and a program.

Description of the Related Art

An apparatus as an example of an image forming apparatus may have an enforced function by installing a program such as an application program. Said differently, a user may expect a change in work efficiency or the like by installing an application suitable for his own work.

In order to effectively use a function substantialized by an operation of the program, an appropriate value may be set (customized) to setup information (a parameter) for stipulating the operation of the program. Along with installing of the program, there may be a case where a setup suitable for the operation of the program is done.

However, multiple apparatuses may be installed in an office or the like. In a case where the same program is installed on each of the multiple apparatuses under this situation, similar setup works of setting the setup information may be done to cause inefficiency.

In a case where the program is installed on the apparatus and then the program is uninstalled from the apparatus, a setup operation of returning the setup information of the apparatus to the condition before installing the program is cumbersome.

An embodiment of the present invention is provided in consideration of the above points. An object of the embodiment is to pursue the efficiency of a setup operation accompanied by a change in a program structure in the apparatus.

SUMMARY OF THE INVENTION

According to one aspect of the present invention, there is provided an apparatus including an installing unit configured to acquire a program from an information processing apparatus coupled to a network and install the acquired program on the apparatus, an acquiring unit configured to acquire setup information applied to the apparatus at an installing destination, to which the program is installed, the acquiring unit acquiring first setup information sent to the information processing apparatus from the apparatus or another apparatus before installing the program, and an applying unit configured to apply the first setup information to the apparatus in response to installing of the program.

BRIEF DESCRIPTION OF THE DRAWINGS

FIG. 7 illustrates a first example of registration information of an apparatus setup and an app setup.

FIG. 8 illustrates a first example in which a vendor recommended value is stored in an apparatus setup history memory unit.

FIG. 9 illustrates a second example of the registration information of the apparatus setup and the app setup.

FIG. 10 illustrates a second example in which the vendor recommended value is stored in the apparatus setup history memory unit.

FIG. 12 illustrates an exemplary structure of the apparatus setup memory unit.

FIG. 13 illustrates an example in which a backup of apparatus information generated along with installing of the application is stored in the apparatus setup history memory unit.

Hereinafter, an embodiment of the present invention is described based on figures.

First Embodiment

Figure 1:
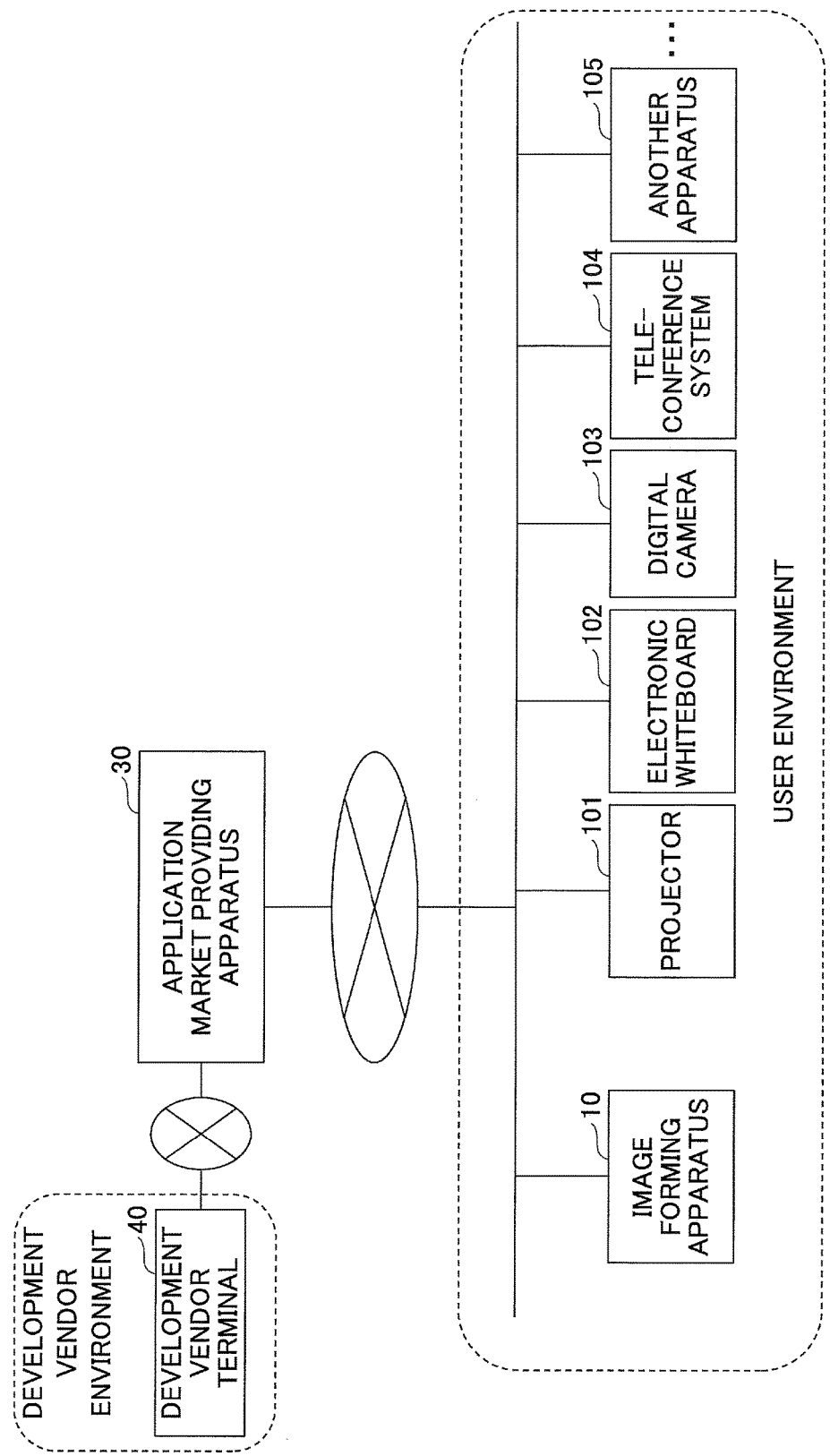
FIG. 1 illustrates an exemplary system structure of a first embodiment of the present invention.

FIG. 1 illustrates an exemplary system structure of a first embodiment of the present invention. Referring to FIG. 1, a user environment is an office of a user of an image forming apparatus 10. In this user environment, multiple image forming apparatuses such as an image forming apparatus 10, projector 101, an electronic whiteboard 102, a digital camera 103, a teleconference system 104, and another apparatus 105 are coupled to an application market providing apparatus 30 through a network such as the Internet. The application market providing apparatus 30 is a computer providing a web site (hereinafter, referred to as an "application market") as a marketplace for various application programs (hereinafter, referred to as an "application"), which can be installed on various image forming apparatuses 10. The various image forming apparatuses 10 access the application market to enable the application designated by the user to be downloaded. The application market may be served as a cloud service.

A development vendor environment is an office or the like of a software vendor (hereinafter, referred to as a "development vendor"), which develops the application installed on the image forming apparatus 1, or the like. The development vendor environment includes at least one development vendor terminal 40. Each development vendor terminal 40 is coupled to the application market providing apparatus 30 through a network such as the Internet. Each development vendor terminal 40 is used to upload the developed application into the application market.

Figure 2:
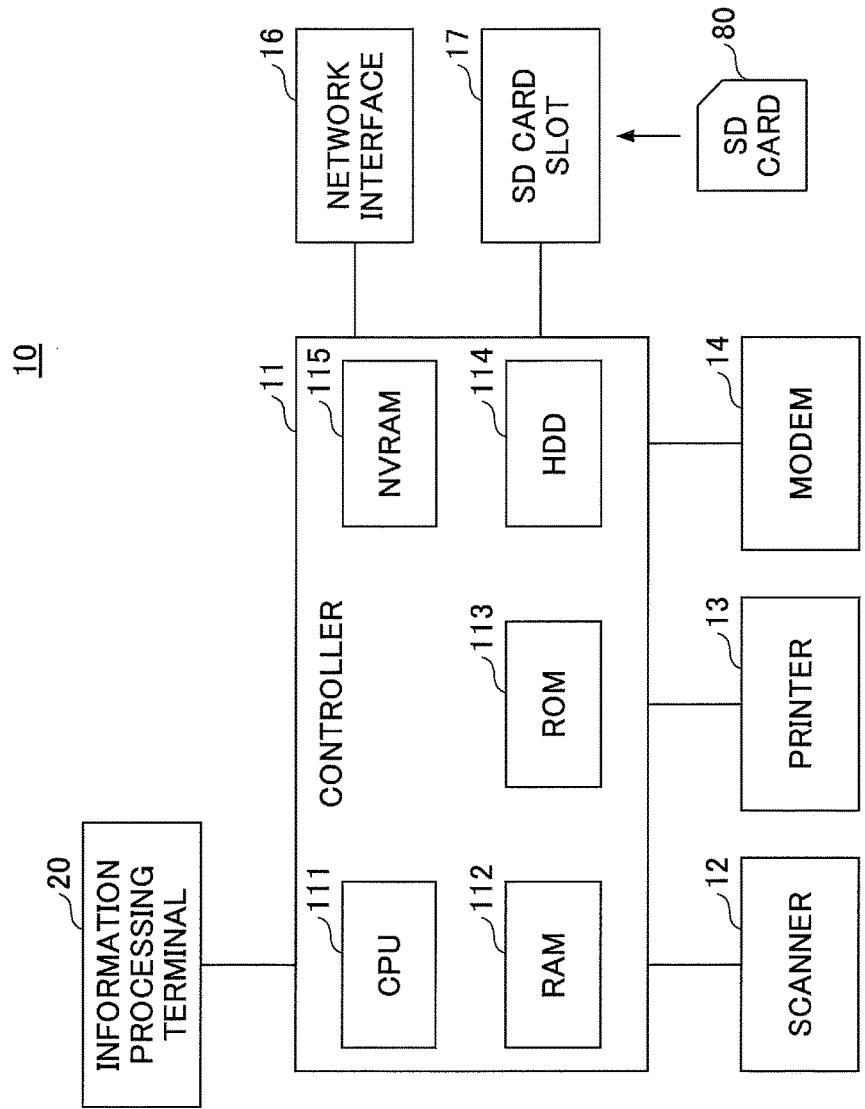
FIG. 2 illustrates an exemplary hardware structure of an image forming apparatus of the first embodiment of the present invention.

FIG. 2 illustrates the exemplary hardware structure of the image forming apparatus of the first embodiment. Referring to FIG. 2, the image forming apparatus 10 includes hardware such as a controller 11, a scanner 12, a printer 13, a modem 14, a network interface 16, and a secure digital (SD) card slot 17.

The controller 11 includes a central processing unit (CPU) 111, a random access memory (RAM) 112, a read-only memory (ROM) 113, a hard disk drive (HDD) 114, a non-volatile random access memory (NVRAM) 115, and so on. Various programs and data used by the programs are stored in the ROM 113. The RAM 112 is used as a memory area for loading the programs, a work area for the loaded programs, or the like. The CPU 111 substantializes various functions by processing the program loaded into the RAM 112. The HDD 114 stores the programs, various data used by the programs, or the like. The NVRAM 115 stores various setup information or the like.

The scanner 12 is hardware (an image reading unit) for reading image data from an original (an original manuscript). The printer 13 is hardware (a printing unit) for printing print data on a print paper. The modem 14 is hardware for connecting the apparatus 10 to a telecommunication line and is used for sending and receiving the image data with fax communications. The network interface 16 is hardware for connecting the apparatus 10 to a wired or wireless network such as a local area network (LAN). The SD card slot 17 is used to read a program stored in an SD card 80. Said differently, not only the program stored in the ROM 113 but also the program stored in the SD card 80 may be loaded into the RAM 112 and executed by the image forming apparatus 10. The SD card 80 may be substituted by another recording medium such as a CD-ROM and a universal serial bus (USB) memory. The kind of the recording medium corresponding to the position of the SD card 80 may not be limited to a predetermined type. In this case, the SD card slot 17 may be replaced by hardware depending on kinds of the recording medium.

The information processing terminal 20 is connected to the controller 11. The information processing terminal 20 is an electronic apparatus, which can individually processes information, such as a smartphone and a tablet-type terminal. Within the first embodiment, the information processing terminal 20 functions as an operation unit of the image forming apparatus 10. Specifically, the information processing terminal 20 is connected to the image forming apparatus 10 instead of a conventional operation unit installed exclusively for the image forming apparatus 10. The controller 11 and the information processing terminal 20 may be connected through, for example, a universal serial bus (USB) cable, near field communications, or a local area network (LAN).

Figure 3:
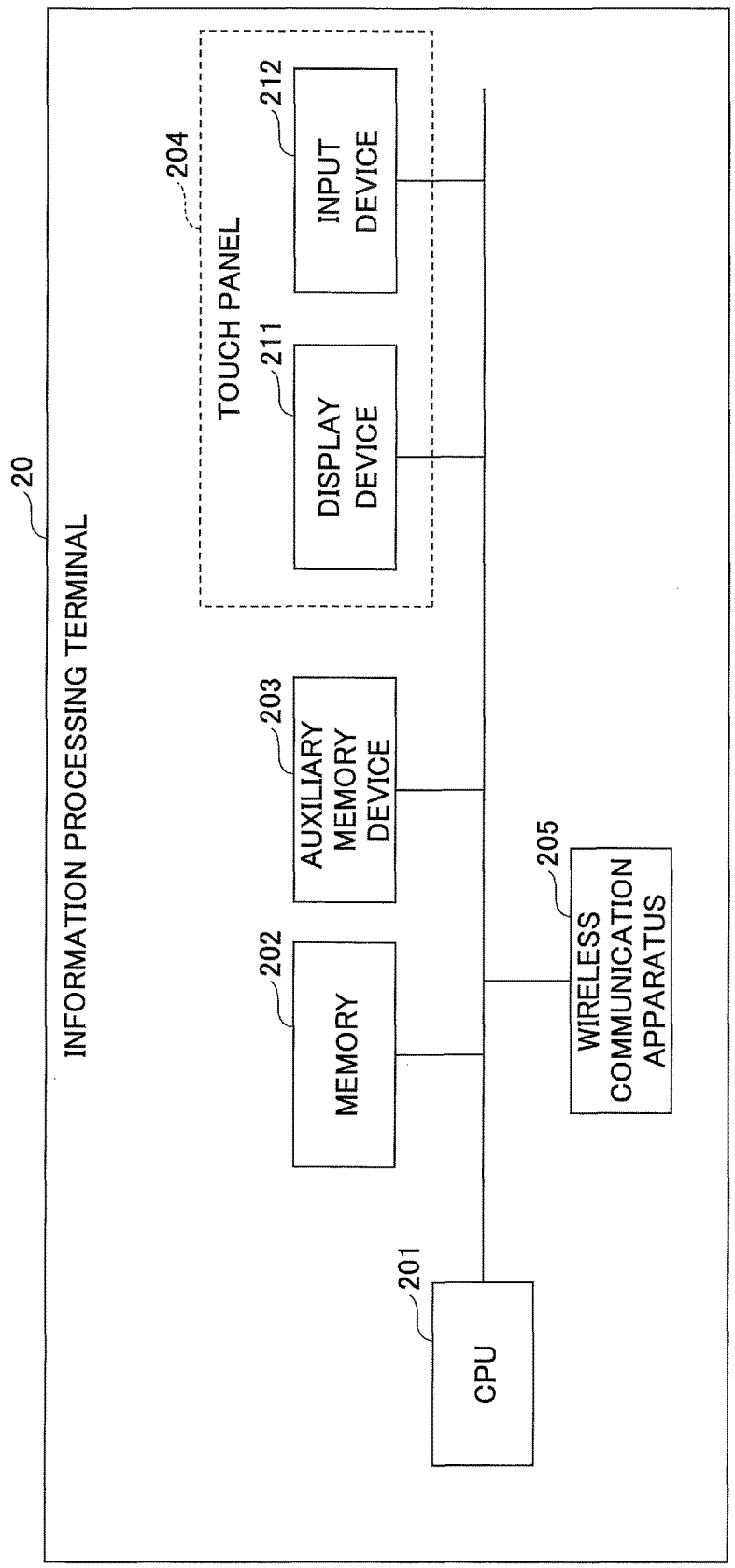
FIG. 3 illustrates an exemplary hardware structure of an information processing apparatus of the first embodiment.

FIG. 3 illustrates an exemplary hardware structure of an information processing apparatus of the first embodiment. Referring to FIG. 3, the information processing terminal 20 includes a CPU 201, a memory 202, an auxiliary memory device 203, a touch panel 204, and a wireless communication apparatus 205.

The auxiliary memory device 203 stores a program or the like installed in the information processing terminal 20. The memory 202 reads out the program from the auxiliary memory device 203 when the program is instructed to be invoked and stores the program in the memory 202. The CPU 201 substantializes a function related to the information processing terminal 20 in conformity with the program stored in the memory 202.

The touch panel 204 is an electronic component having both an input function and a display function to display information or receive an input from a user. The touch panel 204 includes a display device 211, an input device 212, or the like.

The display device 211 is a liquid crystal display or the like and performs a display function of the touch panel 204. The input device 212 is an electronic component including a sensor for detecting a touch of a touching object on the display device 211. A detection method of the touching object may be any one of known methods such as an electrostatic method, a resistance film method, and an optical method. The touching object is an object touching a contact surface (a front surface) of the touch panel 204. As an example of the touching object is a finger of the user, a dedicated pen, an ordinary pen, or the like.

The wireless communication apparatus 205 is an electronic component such as an antenna for communications in a wireless local area network (LAN) or a mobile communication network.

Figure 4:
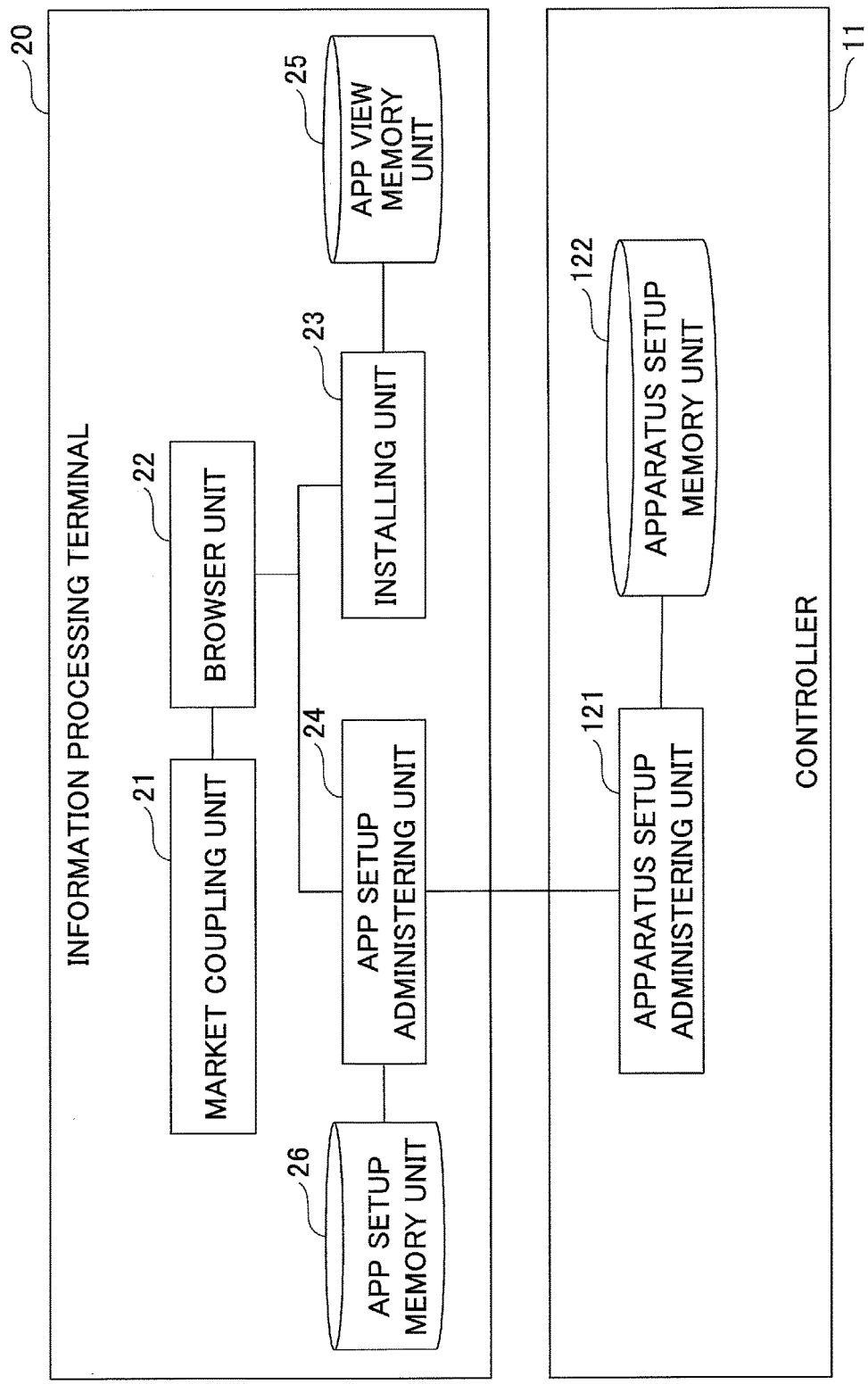
FIG. 4 illustrates an exemplary functional structure of the image forming apparatus of the first embodiment.

FIG. 4 illustrates an exemplary functional structure of the image forming apparatus of the first embodiment. Referring FIG. 4, the information processing terminal 20 includes a market coupling unit 21, a browser unit 22, an installing unit 23, an app setup administering unit 24, and so on. The market coupling unit 21, the browser unit 22, the installing unit 23, the app setup administering unit 24, and so on are substantialized when one or more programs installed in the image forming apparatus 20 are executed by the CPU 201. The information processing terminal 20 further includes an app view memory unit 25 and an app setup memory unit 26. The app view memory unit 25 and the app setup memory unit 26 can be substantialized by the auxiliary memory device 203 or the like.

The market coupling unit 21 requests the browser unit 22 to coupling the information processing apparatus 20 to the application market in response to an instruction by the user.

The browser unit 22 functions as a web browser. For example, the browser unit 22 accesses the application market and causes a web page related to the application market to be displayed on the display device 211. The browser unit 22 controls a process with respect to the web page being displayed in response to an operation by the user.

The installing unit 23 controls installing the application onto the information processing terminal 20. The app view memory unit 25 stores view information of the application installed on the information processing terminal 20.

The app setup administering unit 24 stores setup information of the application installed on the information processing terminal 20 in the app setup memory unit 26, reads the setup information stored in the app setup memory unit 26, and deletes the setup information uninstalled from the information processing terminal 20 from the app setup memory unit 26.

The app setup memory unit 26 stores the setup information (hereinafter, referred to as an "app setup") corresponding to each application for each application. However, the app setup common to the multiple applications may exist.

Meanwhile, the controller 11 includes an apparatus setup administering unit 12. The apparatus setup administering unit 121 is substantialized by a process caused by the CPU 111 to execute at least one program installed on the controller 11. The controller 11 further includes an apparatus setup memory unit 122. The apparatus setup memory unit 122 can be substantialized by using, for example, the HDD, the NVRAM115, or the like.

The apparatus setup administering unit 121 updates setup information (hereinafter, referred to as an "apparatus setup") for the apparatus stored in the apparatus setup memory unit 122 or reads out the apparatus setup from the apparatus setup memory unit 122 along with installing of the application or in response to an instruction of the user. The apparatus setup is, for example, the setup information related to the operation, the behavior, the control, or the like of the apparatus, and is different from an app setup set each application.

Figure 5:
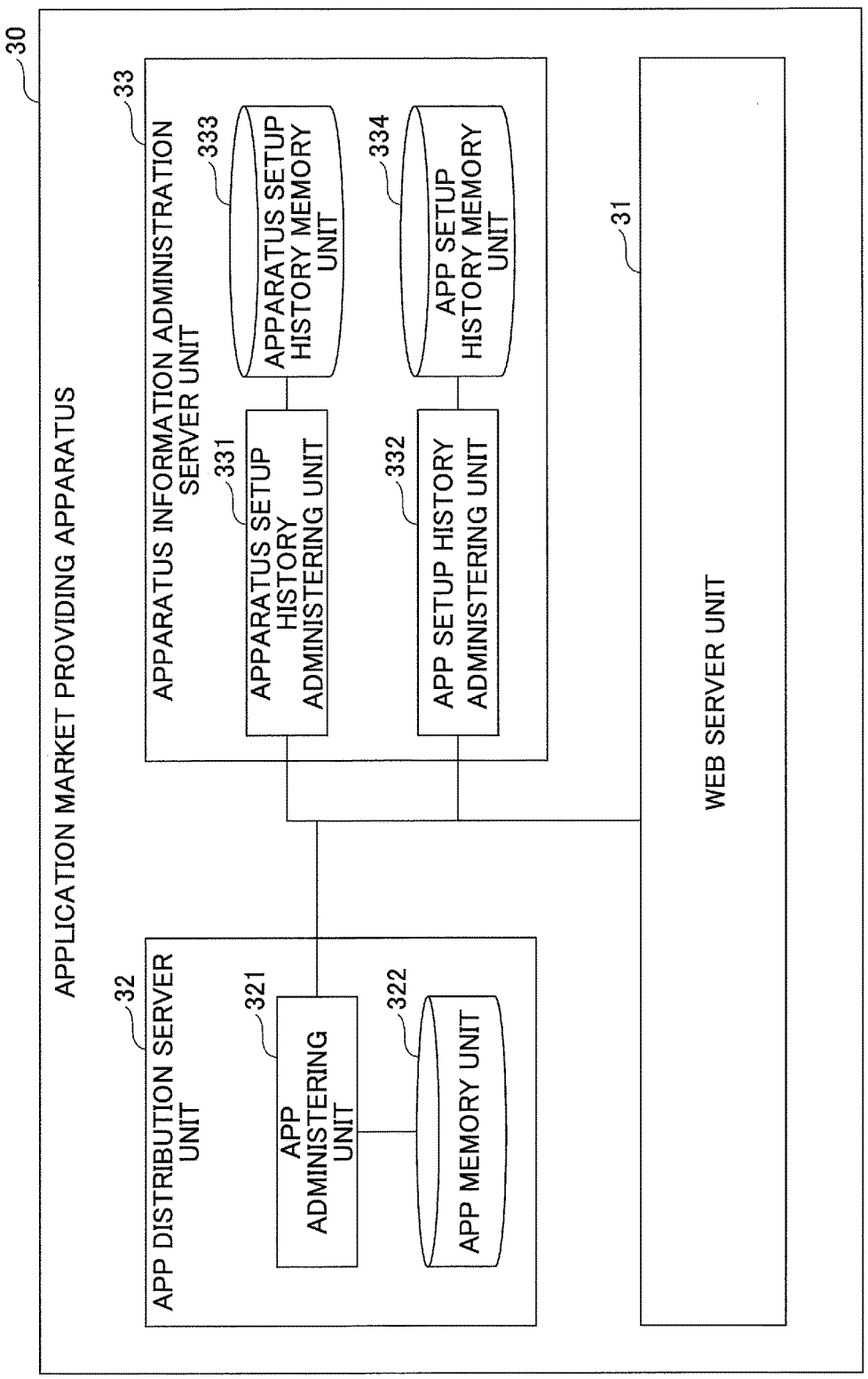
FIG. 5 illustrates an exemplary functional structure of application market providing apparatus of the first embodiment.

FIG. 5 illustrates an exemplary functional structure of application market providing apparatus of the first embodiment. Referring to FIG. 5, the application market providing apparatus 30 includes a web server unit 31, an app distribution server unit 32, and an apparatus information administration server unit 33. The web server unit 31, the app distribution server unit 32, and the apparatus information administration server unit 33 are substantialized by a process caused by the at least one program executed in the CPU of the application market providing apparatus 30. The web server unit 31, the app distribution server unit 32, and the apparatus information administration server unit 33 may be respectively substantialized by different computers. These computers may be further distributed in further minute units. Said differently, the application market providing apparatus 30 may be substantialized by using one or multiple computers.

The web server unit 31 provides a web page related to the application market to the image forming apparatus 10. The web server unit 31 controls a process corresponding to a request generated in response to the operation of the web page.

The app distribution server unit 32 includes an app administering unit 321 and an app memory unit 322. The app memory unit 322 stores an application group, which is a set of multiple applications capable of being installed on the image forming apparatus 10. The app administering unit 321 reads the application designated as an installing target in the image forming apparatus 10 from the app memory unit 322 and sends the read application to the image forming apparatus 10. The app memory unit 322 can be substantialized by a memory device of the application market providing apparatus 30 or a memory device which can be coupled to the application market providing apparatus 30 through a network.

The apparatus information administration server unit 33 includes an apparatus setup history administering unit 331, an app setup history administering unit 332, an apparatus setup history memory unit 333, and an app setup history memory unit 334. The apparatus setup history administering unit 331 stores the apparatus setup uploaded from the image forming apparatus in the apparatus setup history memory unit 333. The apparatus setup history administering unit 331 sends the apparatus setup stored in the apparatus setup history memory unit to the image forming apparatus 10 in response to a request from the image forming apparatus 10. The app setup administering unit 24 stores the app setup uploaded from the image forming apparatus 10 in the app setup history memory unit 334 for each application. The apparatus setup history administering unit 332 sends the app setup stored in the app setup history memory unit 334 to the image forming apparatus 10 in response to a request from the image forming apparatus 10.

Figure 6:
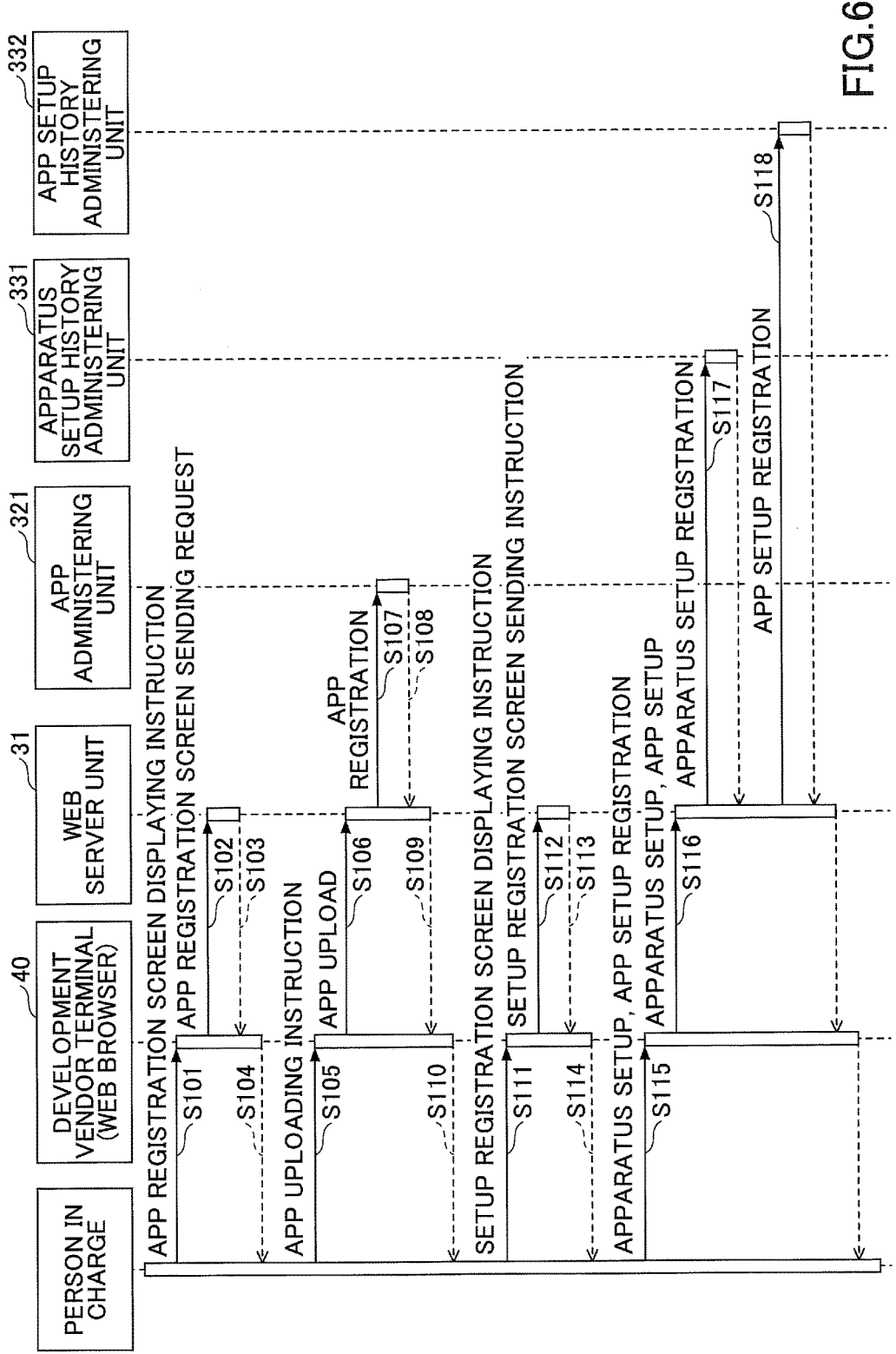
FIG. 6 is a sequence diagram illustrating an exemplary process at a time of uploading an application from a development vendor to an application market providing apparatus.

Hereinafter, a process performed in a system of the first embodiment is described. FIG. 6 is a sequence diagram illustrating an exemplary process at a time of uploading the application from the development vendor to an application market providing apparatus.

A person in charge of the development vendor inputs an instruction to display an app registration screen of an application market to a web browser of the development vendor terminal 40 (step S101). The web browser of the development vendor terminal 40 sends a request to send the app registration screen to the web server unit 31 (step S102). In the instruction to display the app registration screen of the application market, the uniform resource locator (URL) corresponding to the app registration screen of the application market is input into the web browser.

The web server unit 31 sends the web page for displaying the app registration screen to the web browser of the development vendor terminal 40 in response to the request to send the app registration screen (step S103). The web browser displays the app registration screen based on the web page (step S104).

Subsequently, the person in charge designates the application (hereinafter, referred to as a "target app") of an upload target from among the applications stored in the development vendor terminal 40 and inputs an app uploading instruction to upload the target app (step S105). The web browser of the development vendor terminal 40 uploads (sends) the target app to the web server unit 31 (step S106). The web server unit 31 requests the app administering unit 321 to register the uploaded target app (step S107). Then, the app administering unit 321 stores the target app in the app memory unit 322. Each application is stored in the app memory unit 322 in association with corresponding identification information (hereinafter, referred to as an "app ID"). The app ID may be uploaded from the development vendor terminal 40 together with the application or automatically allocated by the app administering unit 321.

The app administering unit 321 returns a response indicating that the application is normally registered (step S108). The web server unit 31 resends the web page of the app registration screen to the web browser of the development vendor terminal (step S109). The web browser displays the app registration screen based on the web page (step S110).

Subsequently, for example, the person in charge selects a menu included in the app registration screen and inputs an instruction to display a setup registration screen (step S111). The web browser of the development vendor terminal 40 sends a request to send the setup registration screen to the web server unit 31 (step S112). The web server unit 31 sends the web page for displaying the setup registration screen to the web browser of the development vendor terminal 40 in response to the request to send the setup registration screen (step S113). The web browser displays the setup registration screen based on the web page (step S114).

Subsequently, the person in charge inputs a setup value (e.g., a recommended value) applicable to the image forming apparatus 10 which is an installing destination of the target app, a setup item being a destination of applying the setup value, and a setup item forming the app setup of the setup value from among setup items forming the apparatus setup displayed on the setup registration screen (step S115). Then, the web browser of the development vendor sends registration information including the input information and the app ID of the target app to the web server unit 31 (step S116). The web page related to the setup registration screen includes a definition causing the app ID of the target app to be sent together with the set content.

FIG. 7 illustrates a first example of registration information of an apparatus setup and an app setup. Referring to FIG. 7, the app ID of the target app is "app A" as an example. The app setup of the app A indicates that the setup item having a setup item name "sending destination mail address" is included in the registration information. Further, it is indicated that a value is set to the setup item having a setup item name "prioritized app setup" or "heap size" from among the setup items forming the apparatus setup in response to an installation of the app A. Further, "prioritized app setup" indicates that a value "app A" is to be applied and "heap size" indicates that the heap size for the app A is 32 MB.

Referring to FIG. 7, attribute information is given to each setup item of the app setup or each setup item of the apparatus setup. Specifically, attribute information "setup unique to app" is given to "sending destination mail address". The "setup unique to app" indicates that the setup item unique to or exclusive to the app A and does not interfere with the setup item of the other application. For example, the setup item "sending destination mail address" of the app A indicates that the app A is stored in a dedicated file. There is "setup common to app" in addition to "setup common to app". The setup item "setup common to app" indicates that the setup item is applied in common with multiple applications.

The attribute information of "exclusion" or "combination" is given to the setup item of the apparatus setup. The "exclusion" indicates that the values of the setup items of the multiple applications ("prioritized app setup" in FIG. 7) are exclusive. The "prioritized app setup" is the setup item for specifying the application that firstly occupies the screen at a time of starting up the image forming apparatus 10, for example. Therefore, only the app ID of any one application can be set to "prioritized app setup". As described above, the attribute information "exclusion" is given to the setup item, to which only one application can be set with respect to the setup value.

Meanwhile, "combination" indicates that the setup values of the multiple applications are combined. The "heap size" indicates the size of a heap area secured for an application group inside the image forming apparatus 10. Therefore, a total value of heap sizes for the applications installed in the image forming apparatus 10 is to be set to "heap size" of the apparatus setup. Otherwise, there is a probability that a part of the applications cannot start up. Therefore, the attribute information "combination" is given to "heap size".

After the web server unit 31 receives the registration request including the above registration information, the web server unit 31 sends the app ID and the apparatus setup from among the registration information to the apparatus setup history administering unit 331 (step S117). The apparatus setup history administering unit 331 causes the information associating the app ID with the apparatus setup to be stored in the apparatus setup history memory unit 333 as a vendor recommended value.

FIG. 8 illustrates a first example in which a vendor recommended value is stored in an apparatus setup history memory unit. Referring to FIG. 8, the apparatus setup history memory unit 333 stores a record (hereinafter, referred to as a "registration unit record") including the version information for each registration of the apparatus setup. Further, one registration unit record includes a record (hereinafter, referred to as an "apparatus setup record") for storing the setup item name, the setup value, the exclusion, and the combination for each setup item included in the registered apparatus setup.

The version information is information for identifying a version for a set of the apparatus setup records included in the registration unit record. Referring to FIG. 8, "app A (vendor recommended value)" as an example of the version information indicates that the app A is the apparatus setup recommended by the vendor. The exclusion corresponds to "exclusion" explained in FIG. 7. The combination corresponds to "combination" explained in FIG. 7. Referring FIG. 8, the content of the registration unit record whose version information is "app A (vendor recommended value)" is based on the apparatus setup illustrated in FIG. 7.

Subsequently, the web server unit 31 sends the app ID and the app setup from among the registration information to the app setup history administering unit 332 (step S118). The app setup history administering unit 332 causes the information associating the app ID with the app setup to be stored in the app setup history memory unit 334 as a vendor recommended value.

After the process illustrated in FIG. 6 is executed for app B, which has an app setup and recommended values of an apparatus setup as illustrated in FIG. 9, the apparatus setup history memory unit 333 becomes in a state as illustrated in FIG. 10.

Figure 11:
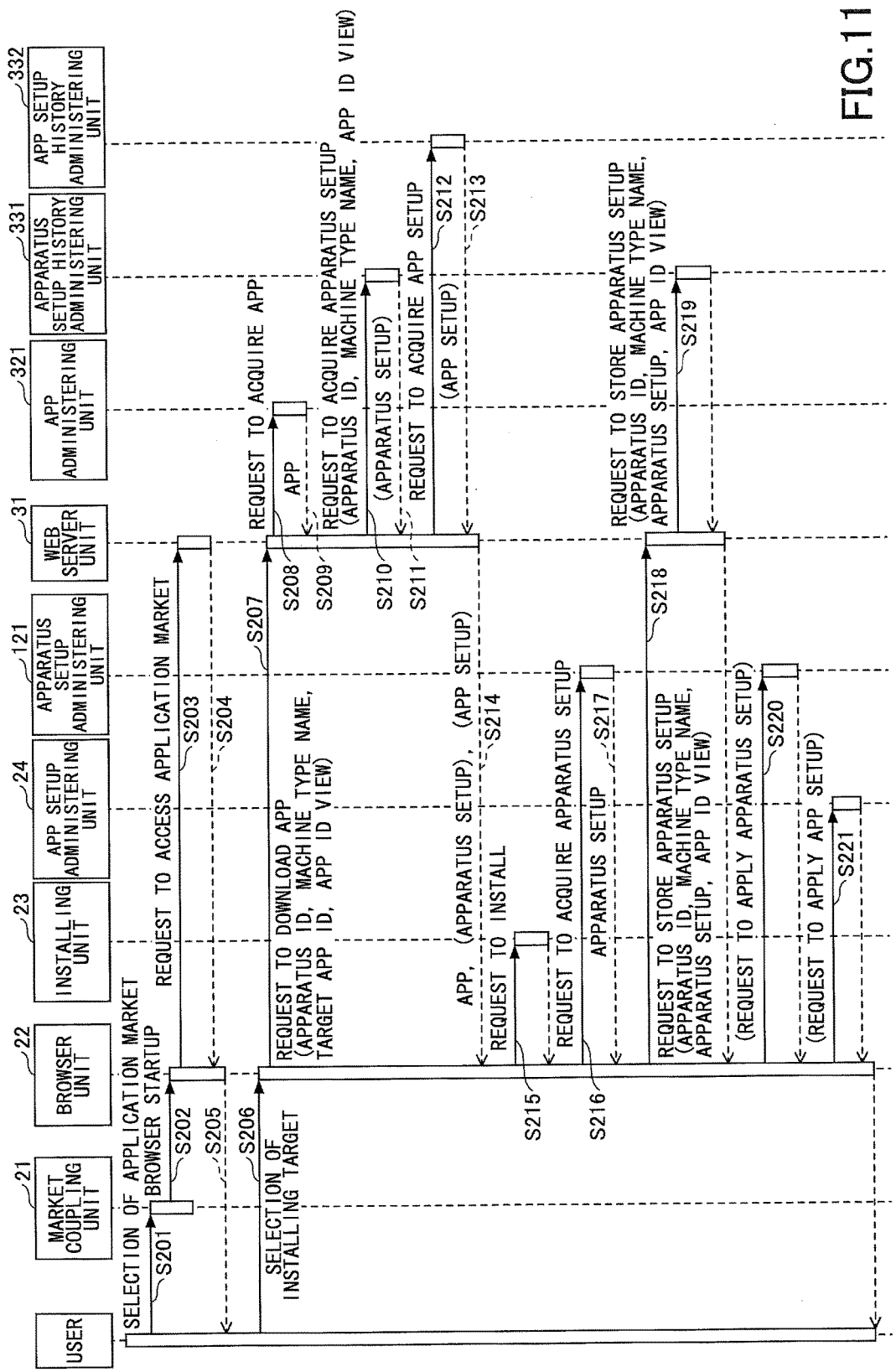
FIG. 11 is a sequence diagram illustrating an exemplary procedure at a time of installing the application of the first embodiment.

Next, a procedure executed for the user environment is explained. FIG. 11 is a sequence diagram illustrating an exemplary procedure at a time of installing the application of the first embodiment.

A user operating any one (hereinafter, referred to as a "target apparatus") of the image forming apparatus 10 in the user environment selects an icon indicative of an application market from among icons displayed on the display device 211 of the information processing terminal 20 of the target apparatus (step S201). The market coupling unit 21 starts up the browser unit 22 (step S202). At this time, the URL of the application market is reported to the browser unit 22.

The browser unit 22 sends an access request to access the application market to this URL (step S203). After receiving the access request, the web server unit 31 generates a web page for displaying an application market screen and sends the web page to the browser unit 22 (step S204). The application market screen includes a view of the applications which can be downloaded. The web server unit 31 may inquire of the app administering unit 321 about the view of the applications which are stored in the app memory unit 322 to generate the web page.

Subsequently, the browser unit 22 displays the application market screen on the display device 211 based on the web page (step S205).

Then, the user selects the application (hereinafter, referred to as a "target app") to be the installing target through the application market screen (step S206). The browser unit 22 sends a download request including the apparatus ID and the machine type name of the target apparatus, a view of the app IDs of the applications already installed in the information processing terminal 20 of the target apparatus, and the app ID of the target app to the web server unit 31 (step S207). The apparatus ID is identification information for each image forming apparatus 10. The view of the app IDs of the applications already installed in the information processing terminal 20 can be acquired from the app view memory unit 25 through the installing unit 23.

The web server unit 31 sends an acquisition request to acquire the application corresponding to the app ID of the target app included in the download request to the app administering unit 321 (step S208). The app administering unit 321 acquires the target app corresponding to the app ID from the app memory unit 322 and sends the target app to the web server unit (step S209).

Subsequently, the web server unit 31 sends an acquisition request to acquire an apparatus setup, which corresponds to the app IDs including the apparatus ID, the machine type name, the app ID of the target app, and the view of the app IDs of the existing applications, to the apparatus setup history administering unit 331 (step S210). Here, the apparatus ID, the machine type name, the app ID of the target app, and the view of the app IDs of the existing applications are included in the download request. If the registration unit record, which corresponds to the apparatus ID, the machine type name, and the view of the app IDs (the app ID of the target app and the app ID of the existing app) is stored in the apparatus setup history memory unit 333, the apparatus setup history administering unit 331 acquires the apparatus setup and sends the apparatus setup to the web server unit 31 (step S211). As described later, the apparatus setup history memory unit 333 may store the registration unit record, which includes the apparatus ID, the machine type name, and the view of the app IDs in the version information.

If there is no corresponding registration unit record, the apparatus setup history administering unit 331 loosens up a search condition little by little and searches the registration unit record. For example, the apparatus ID and the view of the app IDs of the existing application are sequentially removed from the search condition and the registration unit record including the version information matching the search condition is searched. Therefore, the app ID of the target app becomes the search condition. In this case, if the apparatus setup corresponding to the app ID is stored in the apparatus setup history memory unit 333, the apparatus setup history administering unit 331 acquires the apparatus setup and sends the acquired apparatus setup to the web server unit 31 (step S211). For example, if the apparatus setup recommended by the vendor is stored in the apparatus setup history memory unit 333 in association with the app ID, this apparatus setup is sent to the web server unit 31. In a case where there is no apparatus setup corresponding to the app ID, the apparatus setup is not sent in step S211.

Subsequently, the web server unit 31 sends an acquisition request to acquire the app setup associated with the app ID of the target app to the app setup history administering unit 332 (step S212). If the app setup corresponding to the app ID is stored in the app setup history memory unit 334, the app setup history administering unit 332 acquires the app setup and sends the app setup to the web server unit 31 (step S213). For example, if the app setup recommended by the vendor is stored in the app setup history memory unit 334 in association with the app ID, this app setup is sent to the web server unit 31. In a case where there is no app setup corresponding to the app ID, the app setup is not sent in step S213.

Then, the web server unit 31 sends the target app to the browser unit (step S214). In a case where the app setup and the apparatus setup related to the target app are acquired, the apparatus setup and the app setup are sent to the browser unit 22.

Then, the browser unit 22 requests the installing unit 23 to install the target app, the installing unit 23 installs the target app on the information processing terminal 20 and adds the app ID of the target app to the app view memory unit 25 (step S215). At this time, the apparatus setup related to the target app and the app setup are not applied.

Then, the browser unit 22 sends the acquisition request to acquire the apparatus setup at the present time (said differently, before applying the apparatus setup related to the target app) to the apparatus setup administering unit 121 (step S216). The apparatus setup administering unit 121 sends information related to all the setup items stored in the apparatus setup memory unit 122 to the browser unit 22 in response to the acquisition request (step S217).

FIG. 12 illustrates an exemplary structure of the apparatus setup memory unit. Referring to FIG. 12, the apparatus setup memory unit 122 stores "setup item name", "setup value", "whether setup is possible", "whether it is necessary to be unique to apparatus", "exclusion", "combination", and so on for each setup item.

The "setup item name" is the name of the setup item. A part before "- (hyphen)" in the "setup item name" indicates the name of a classification to which the setup item belongs. The "setup value" is a value set to the setup item. The "whether setup is possible" indicates whether the setup value can be set from the application. The "whether it is necessary to be unique to apparatus" indicates whether the setup value needs to be a unique value for each image forming apparatus 10". The "exclusion" corresponds to "exclusion" explained in FIG. 7. The "combination" corresponds to "combination" explained in FIG. 7.

Referring to FIG. 12, the setup value of the "prioritized app setup" of the target apparatus is "app C, and the setup value of the "heap size" is "16 MB".

In step S217, "setup item name", "setup value", "whether setup is possible", "whether it is necessary to be unique to apparatus", "exclusion", "combination", and so on are sent to the browser unit 22 for each setup item stored in the apparatus setup memory unit 122. However, the setup item having a value "possible" in "whether setup is possible" from among the setup items stored in the apparatus setup memory unit 122. This is because the setup value is not changed for a setup item other than the above set up item in response to installing of the application Then, the browser unit 22 sends a store request to store the apparatus setup acquired in step S217 to the web server unit 31 (step S218). The store request includes the apparatus setup, the apparatus ID of the target apparatus, the machine type name of the target apparatus, and a view (hereinafter, referred to as "app ID view") of the app IDs of the applications which were installed before installing the target app on the information processing terminal 20. This app ID view may be acquired before executing step S215, for example. The web server unit 31 transfers the store request to the apparatus setup history administering unit 331 after receiving the store request (step S219). The apparatus setup history administering unit 331 stores the apparatus setup related to the store request into the apparatus setup history memory unit 333 in association with the apparatus ID and the app ID view included in the store request. Said differently, in the image forming apparatus 10 related to this apparatus ID, the apparatus setup in a state where the application related to the app ID view backed up into the apparatus setup history memory unit 333.

FIG. 13 illustrates an example in which a backup of apparatus information generated along with installing of the application is stored in the apparatus setup history memory unit. Referring to FIG. 13, the registration unit record whose value of information is "apparatus a (machine type A)/app C" is an example of a registration unit record stored in response to step S219. The version information follows a format of "apparatus ID (machine type name)/app ID view". Said differently, FIG. 13 illustrates an example in which the app ID of the target apparatus is "apparatus a", the machine type name is "machine type A", and the application installed on the information processing terminal 20 of the target apparatus is "app C". In a case where multiple applications are installed, each app ID is separated by, for example, ",", and included in the version information.

As such, the apparatus setup is stored in the apparatus setup history memory unit 333 in association with information (e.g., the view of the installed application) indicative of a state of the image forming apparatus 10, to which the apparatus setup is applied.

Then, the browser unit 22 sends an application request to apply the apparatus setup to the apparatus setup administering unit 121 if the apparatus setup is received in step S214 (step S220). The apparatus setup administering unit 121 reflects the apparatus setup to the apparatus setup memory unit 122 in response to the request. For example, if the target app is app A, the value of "prioritized app setup" is updated to "app A". Further, 32 MB is added to the present setup value of "heap size".

Then, the browser unit 22 sends an application request to apply the app setup to the app setup administering unit 24 if the app setup is received in step S214 (step S221). The app setup administering unit 24 stores the app setup in the app setup memory unit 26 in response to the application request.

In a case where app C is installed on the image forming apparatus 10, which has a machine type name of machine type A and does not have an application being installed in the state illustrated in FIG. 13, referring to FIG. 6, the apparatus setup in which the version information is "apparatus a (machine type A)/app C" is acquired in step S211 and applied to the image forming apparatus 10 in step S216. In this case, the image forming apparatus 10 may be another image forming apparatus having an apparatus ID other than "apparatus a". Said differently, within the first embodiment, each image forming apparatus 10 can cannibalize the apparatus setup uploaded by another image forming apparatus. The apparatus setup is not always the vendor recommended value and may probably be changed in conformity with a mode of using by the user. Therefore, an apparatus setup of another image forming apparatus 10 is cannibalized to reduce a work burden of the apparatus setup accompanied by the change in an application configuration of the image forming apparatus 10.

In a case where there are corresponding multiple registration unit records, a view of the registration unit records may be sent to the browser unit 22. The browser unit 22 causes the view to be displayed and reports the registration unit record selected by the user to the web server unit 31. The web server unit 31 acquires the apparatus setup from the registration unit record selected by the user.

The machine type name may not be a name that exactly distinguishes the machine type or the model. The machine type name may be an identification name for each group of a machine type or a model grouped in a range to which the setup item of the apparatus setup is common.

As described, within the first embodiment, the apparatus setup previously uploaded from the image forming apparatus 10 or the other image forming apparatus to the application market providing apparatus 30 can be cannibalized at a time of installing the application to the image forming apparatus 10 (the information processing terminal 20). Therefore, the setup work along with the change in the application configuration of the image forming apparatus 10 can be more efficiently done to reduce the work burden of the setup work.

Second Embodiment

Next, a second embodiment is described. Differences of the second embodiment from the first embodiment are described. Features of the second embodiment, which are not specifically described, are substantially the same as those of the first embodiment.

Within the second embodiment, a procedure of uninstalling the application is described. The second embodiment is implemented on the premise that the first embodiment is implemented.

Figure 14:
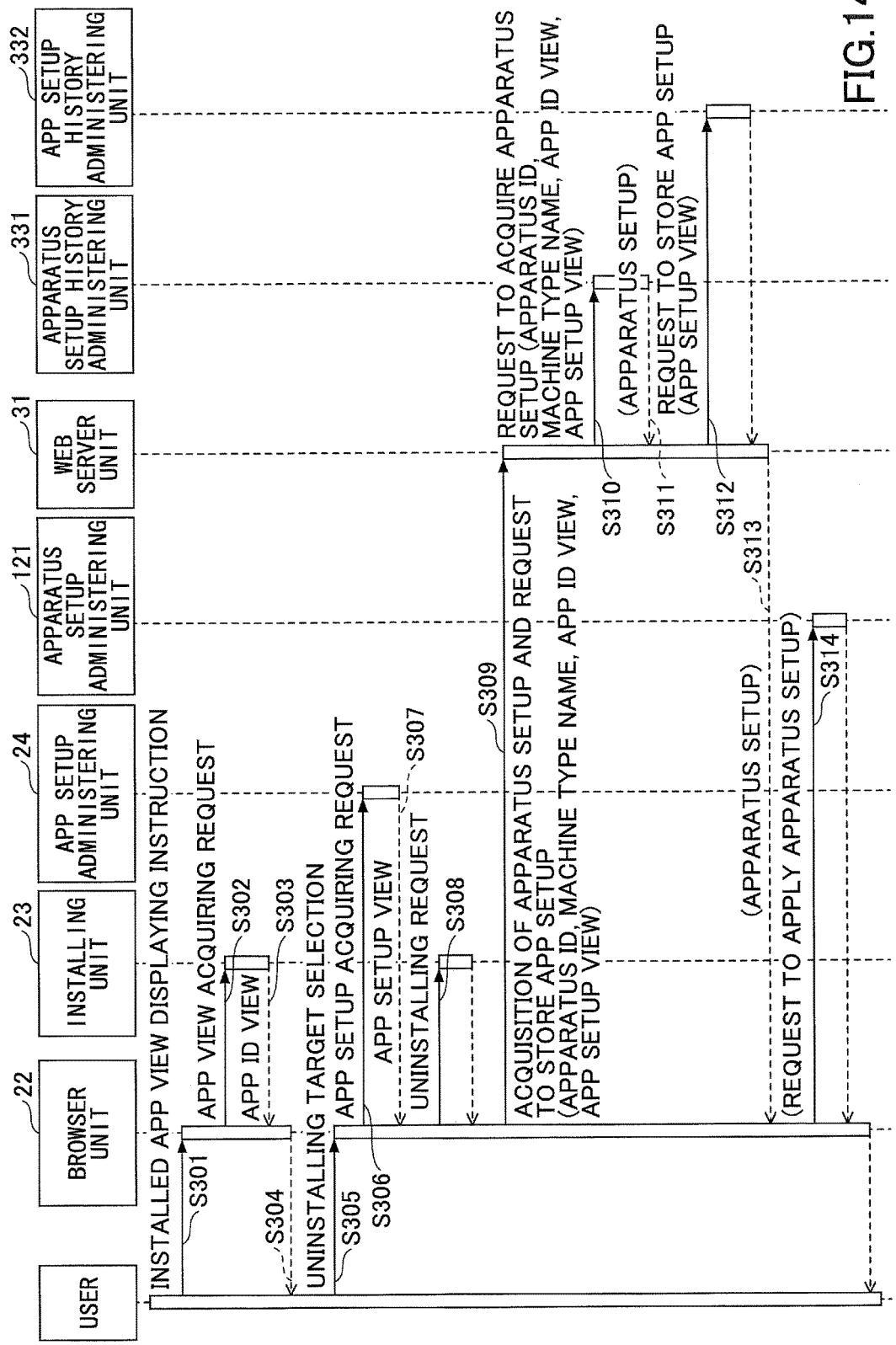
FIG. 14 is a sequence diagram illustrating a procedure at a time of uninstalling the application of a second embodiment.

FIG. 14 is a sequence diagram illustrating an exemplary procedure at a time of uninstalling the application of the second embodiment.

A user operating a certain image forming apparatus 10 (hereinafter, referred to as a "target apparatus") inputs a display instruction to display a view of the installed applications into the information processing terminal 20 of the certain image forming apparatus 10 (step S301). The browser unit 22 requests the installing unit 23 to acquire the view (step S302). The installing unit 23 acquires a view of app ID from the app view memory unit 25 and outputs the view of the app ID to the browser unit 22 (step S303). The browser unit 22 displays the view of the app ID on the display device 211 (S304). Within the second embodiment, the app ID is also the application name. In a case where the app ID and the application name are different, both the app ID and the application name may be stored.

Then, the user selects any one of the app IDs as an uninstalling target from the displayed view of the app IDs by the user (step S305). The browser unit 22 requests the app setup administering unit 24 to acquire all the app setups (step S306). The app setup administering unit 24 outputs a view of all the app setups stored in the app setup memory unit 26 to the browser unit 22 (step S307). Therefore, the view includes the app setup of the application (hereinafter, referred to as a "target app") being the uninstalling target. The app setup acquired in step S307 may be limited to the app setup being the uninstalling target.

Subsequently, the browser unit 22 designates the app ID of the target app and requests the installing unit 23 to execute the uninstalling (step S308). The installing unit 23 uninstalls the target app related to the app ID. The uninstalling causes the app ID to be removed from the app view memory unit 25. Further, if the app setup memory unit 26 stores the app setup associated with the app ID, the app setup is deleted from the app setup memory unit 26.

Then, the browser unit 22 sends an acquisition request to acquire the apparatus setup and a store request to store the app setup to the web server unit 31 (step S309). The acquisition request and the store request includes the app setup view acquired in step S307, the apparatus ID and the machine type name of the target apparatus, and the app ID view of the app ID after the uninstalling of the target app. The app ID view of the app ID after the uninstalling of the target app may be generated by removing the app ID from the app ID view acquired in step S303 or by inquiring the installing unit 23 after the uninstalling of the target app.

In response to the request in step S309, the web server unit 31 sends an acquisition request to acquire the apparatus setup corresponding to the apparatus ID, the machine type name, and the app ID view, which are included in the request, to the apparatus setup history administering unit 331 (step S310). If the registration unit record, which corresponds to the apparatus ID, the machine type name, and the app ID view of the app IDs is stored in the apparatus setup history memory unit 333, the apparatus setup history administering unit 331 acquires the apparatus setup from the registration unit record and sends the apparatus setup to the web server unit 31 (step S311). The process of step S311 is similar to the process of step S211 of FIG. 11. If there is no corresponding registration unit record, the apparatus setup history administering unit 331 loosens up the search condition little by little and searches the registration unit record.

As an exemplary case, the process of FIG. 11 is performed in the image forming apparatus 10 to install the app A and thereafter the process of FIG. 14 is performed to uninstall the app A from the image forming apparatus 10. If another application is not installed or uninstalled in a time duration between the installing of the app A and the uninstalling of the app A, the apparatus setup stored in step S219 illustrated in step S219, said differently, the apparatus setup of the registration unit record whose version information value is "apparatus a (machine type A)/app C" in FIG. 13, is acquired in step S311. The apparatus setup is in a state before the app A is installed in the image forming apparatus 10.

Subsequently, the web server unit 31 sends an registration request to register the app setup view included in the request received in step S309 to the app setup history administering unit 332 (step S312). The app setup history administering unit 332 stores the app setup in the app setup history memory unit 334. The app setup stored at this timing may be acquired in step S213. The app setup is probably changed in conformity with the use mode of the application by the user. Therefore, the app setup stored at this timing is acquired in step S213 to enable the app setup previously set to the application or the app setup set in the other image forming apparatus to be cannibalized at the time of installing the application.

Then, if the apparatus setup is acquired in step S311, the web server unit 31 sends the apparatus setup to the browser unit 22 (step S313). In a case where the apparatus setup is received, the browser unit 22 sends an application request to apply the apparatus setup to the apparatus setup administering unit 121 (step S314). The apparatus setup administering unit 121 reflects the apparatus setup to the apparatus setup memory unit 122 in response to the application request.

As described, within the second embodiment, the apparatus setup set before installing the application is applied to the image forming apparatus 10 at the time of uninstalling the application. Therefore, the work burden of the setup work along with the change in the application configuration of the application of the image forming apparatus 10 can be reduced.

Within the second embodiment the apparatus setup set before uninstalling the application is stored in the apparatus setup history memory unit 333. Therefore, the application is re-installed, the apparatus setup can be cannibalized.

Third Embodiment

A third embodiment is described next. Differences of the third embodiment from the first or second embodiment are described. Features of the third embodiment, which are not specifically described, are substantially the same as those of the first or second embodiment.

Within the third embodiment, described is an example where installing of an application of setting a value to a setup item is not permitted in a case where the value is already set by another application for the setup item having the value of "exclusion" is "O" from among the setup items forming the apparatus setup.

Figure 15:
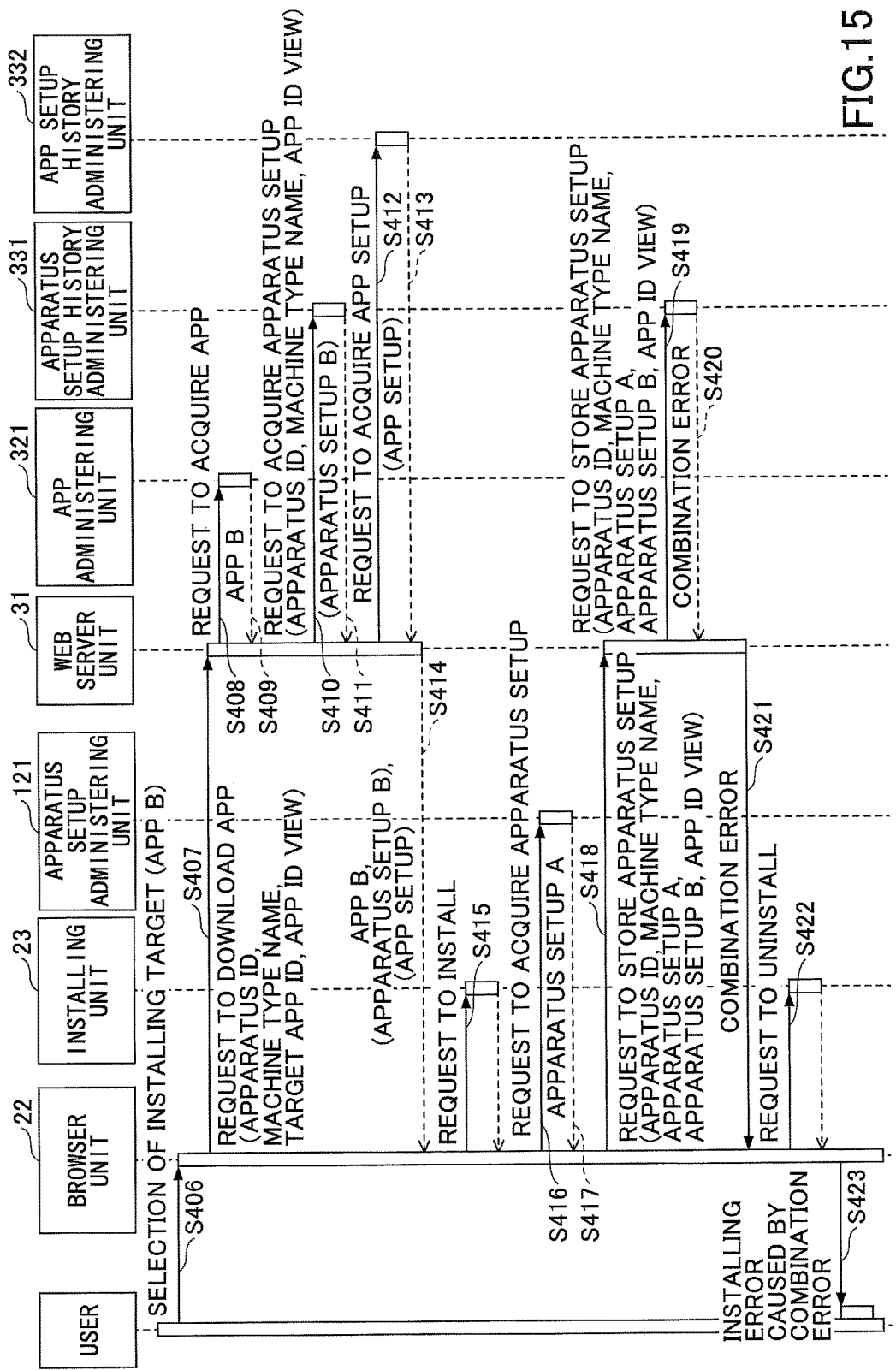
FIG. 15 is a sequence diagram illustrating a procedure at a time of installing the application of a third embodiment.

FIG. 15 is a sequence diagram illustrating an exemplary procedure at a time of installing the application of the third embodiment. FIG. 15 is a procedure performed for the app B after the procedure of FIG. 11 is performed for the app A. The apparatus setup for app A is as illustrated in FIG. 7. The apparatus setup for app B is as illustrated in FIG. 9. Said differently, "prioritized app setup" being "exclusion" overlap on both of the apparatus setup for app A and the apparatus setup for app B.

Steps S406 to S417 are the same as steps S206 to S217 except that the installing target is app B.

In step S418, the browser unit 22 sends a store request to store the apparatus setup set before applying the apparatus setup for app B acquired in step S417 to the web server unit 31. The store request includes the apparatus setup related to app B in addition to data included in the store request in step S218. The apparatus setup is received in step S414. Referring to FIG. 15, "apparatus setup A" is applied to the target apparatus before applying the apparatus setup for app B. The "apparatus setup B" is an apparatus setup related to app B.

The web server unit 31 transfers the store request to the apparatus setup history administering unit 331 after receiving the store request (step S419). The apparatus setup history administering unit 331 determines whether the setup items in a relationship of "exclusion" can overlap between the apparatus setup A and the apparatus setup B, which are included in the store request. Within the third embodiment, "prioritized app setup" is included in both of the apparatus setup A and the apparatus setup B. The apparatus setup history administering unit 331 sends a report of a combination error, which indicates that the combination of the apparatus setup A and the apparatus setup B is inappropriate (step S420). The web server unit 31 sends the combination error to the browser unit 22 (step S421). The web server unit 31 requests the installing unit 23 to uninstall app B in response to the receiving of the combination error (step S422). The installing unit 23 uninstalls app B.

Subsequently, the web server unit 31 displays the combination error on the display device 211 (step S423).

In a case where the setup items in the relationship of "exclusion" do not provisionally overlap, for example, in a case where "prioritized app setup" is not included in the apparatus setup related to app B, a procedure on or after step S420 similar to the procedure on or after step S220 illustrated in FIG. 11 is done as step S420. However, if it is failed to apply an apparatus setup related to app B, app B is uninstalled, and information indicative of the error of the apparatus setup is displayed on the display device 211.

As described, within the third embodiment, in a case where the value is already set to the setup item, which is not allowed to provide an overlapping setup by multiple applications from among the setup items forming the apparatus setup, the application related to the setup item is avoided from being installed. Therefore, it is possible to avoid the value of the setup item from being changed in a situation unintended by the user.

Within the embodiments, the image forming apparatus 10 is described as an example of the apparatus. However, the embodiments may be applied as the apparatus to a projector 101, an electronic whiteboard 102, a digital camera 103, a teleconference system 104, or another apparatus 105.

Within the embodiments, the application market providing apparatus 30 is an example of an information processing apparatus. The browser unit 22 is an example of an acquiring unit and an example of a sending unit. The apparatus setup administering unit 121 is an example of an applying unit.

Although there has been described about the embodiment of the present invention, the present invention is not limited to the above embodiments, and various modifications and changes are possible in a scope of the present invention described in the claims.

It is possible to make a setup operation accompanied by a change in a program structure installed on the apparatus more efficient.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an apparatus has been described in detail, it should be understood that various changes, substitutions, and alterations could be made thereto without departing from the spirit and scope of the invention.

The order of the method of the embodiment of the present invention is not limited to the order of processes of the method disclosed by this disclosure.

It should be noted that a person skilled in the field of information processing technology may employ the present invention using application specific integrated circuits (ASIC) or an apparatus in which circuit modules are connected.

Further, each of the functions (units) may be implemented by one or more circuits.

It should be noted that, in this specification, the circuit may include a processor programed by software to execute the corresponding functions and hardware which is designed to execute the corresponding functions such as the ASIC and the circuit module.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An apparatus comprising:
   an installing unit configured to acquire a program from an information processing apparatus coupled to a network and install the acquired program on the apparatus;
   an acquiring unit configured to acquire setup information applied to the apparatus at an installing destination, to which the program is installed, the acquiring unit acquiring first setup information sent to the information processing apparatus from the apparatus or another apparatus before installing the program; and
   an applying unit configured to apply the first setup information to the apparatus in response to installing of the program.

2. The apparatus according to claim 1, the apparatus further comprising:
   a sending unit configured to send second setup information applied to the apparatus to the information processing apparatus before the first setup information is applied to the apparatus,
   wherein the acquiring unit acquires the second setup information, which is sent by the sending unit and stored in the information processing apparatus, in a case where the program is uninstalled, and
   wherein the applying unit applies the second setup information to the apparatus in response to the uninstalling of the program.

3. The apparatus according to claim 2,
   wherein the sending unit sends third setup information, which is applied to the apparatus before the uninstalling of the program, to the information processing apparatus,
   wherein the acquiring unit acquires the third setup information, which is sent by the sending unit and stored in the information processing apparatus, in a case where the program is re-installed again after the uninstalling of the program, and
   wherein the applying unit applies the third setup information to the apparatus in response to the re-installing of the program.

4. The apparatus according to claim 2,
   wherein the sending unit sends the setup information applied to the apparatus and view information of the program applied to the apparatus in a state where the setup information is applied to the apparatus, and causes the information processing apparatus to store the setup information and the program view information while associating the setup information with the program view information,
   wherein the acquiring unit acquires, in a case where the program is installed or uninstalled, the setup information, which is stored in association with the program view information in a state after the installing or the uninstalling the program, and
   wherein the applying unit applies the setup information acquired by the acquiring unit to the apparatus.

5. The apparatus according to claim 4,
   wherein the sending unit sends a machine type name of the apparatus, the setup information applied to the apparatus, which is applied to the apparatus, and the program view information installed on the apparatus in a state where the setup information is applied to the apparatus to the information processing apparatus, and causes the information processing apparatus to store the machine type name, the setup information, the program view information while associating the machine type name and the setup information with the program view information, and wherein the acquiring unit acquires, in a case where the program is installed or uninstalled, the setup information stored in association with the program view information of the program installed on the apparatus after the installing or the uninstalling of the program and the machine type name of the apparatus from the information processing apparatus.

6. A method for processing information in an apparatus coupled to an information processing apparatus through a network, the method comprising:
acquiring a program from the information processing apparatus;
installing the acquired program on the apparatus;
acquiring setup information applied to the apparatus at an installing destination, to which the program is installed, the acquiring of the setup information being acquiring first setup information sent to the information processing apparatus from the apparatus or another apparatus before installing the program; and
applying the first setup information to the apparatus in response to the installing of the program.

7. The method for processing the information according to claim 6, the method further comprising:
sending second setup information applied to the apparatus to the information processing apparatus before the first setup information is applied to the apparatus,
wherein the acquiring the setup information acquires the second setup information, which is sent by the sending and stored in the information processing apparatus, in a case where the program is uninstalled, and
wherein the applying applies the second setup information to the apparatus in response to the uninstalling of the program.

8. The method for processing the information according to claim 7,
wherein the sending sends third setup information, which is applied to the apparatus before the uninstalling of the program, to the information processing apparatus,
wherein the acquiring the setup information acquires the third setup information, which is sent by the sending and stored in the information processing apparatus, in a case where the program is re-installed again after the uninstalling of the program, and
wherein the applying applies the third setup information to the apparatus in response to the re-installing of the program.

9. The method for processing the information according to claim 7,
wherein the sending sends the setup information applied to the apparatus and view information of the program applied to the apparatus in a state where the setup information is applied to the apparatus, and causes the information processing apparatus to store the setup information and the program view information while associating the setup information with the program view information,
wherein the acquiring the setup information acquires, in a case where the program is installed or uninstalled, the setup information, which is stored in association with the program view information in a state after the installing or the uninstalling the program, and
wherein the applying applies the setup information acquired by the acquiring unit to the apparatus.

10. The method for processing the information according to claim 9,
wherein the sending sends a machine type name of the apparatus, the setup information applied to the apparatus, which is applied to the apparatus, and the program view information installed on the apparatus in a state where the setup information is applied to the apparatus to the information processing apparatus, and causes the information processing apparatus to store the machine type name, the setup information, the program view information while associating the machine type name and the setup information with the program view information, and
wherein the acquiring the setup information acquires, in a case where the program is installed or uninstalled, the setup information stored in association with the program view information of the program installed on the apparatus after the installing or the uninstalling of the program and the machine type name of the apparatus from the information processing apparatus.

11. A non-transitory computer program product to be executed on a computer in an apparatus to perform a method, the method comprising:
acquiring a program from an information processing apparatus coupled to the apparatus through a network;
installing the acquired program on the apparatus;
acquiring the setup information setup information applied to the apparatus at an installing destination, to which the program is installed, the acquiring of the setup information being acquiring first setup information sent to the information processing apparatus from the apparatus or another apparatus before installing the program; and
applying the first setup information to the apparatus in response to the installing of the program.

12. The non-transitory computer program product according to claim 11, the computer program product further comprising:
sending second setup information applied to the apparatus to the information processing apparatus before the first setup information is applied to the apparatus,
wherein the acquiring the setup information acquires the second setup information, which is sent by the sending and stored in the information processing apparatus, in a case where the program is uninstalled, and
wherein the applying applies the second setup information to the apparatus in response to the uninstalling of the program.

13. The non-transitory computer program product according to claim 12,
wherein the sending sends third setup information, which is applied to the apparatus before the uninstalling of the program, to the information processing apparatus,
wherein the acquiring the setup information acquires the third setup information, which is sent by the sending and stored in the information processing apparatus, in a case where the program is re-installed again after the uninstalling of the program, and
wherein the applying applies the third setup information to the apparatus in response to the re-installing of the program.

14. The non-transitory computer program product according to claim 12,
wherein the sending sends the setup information applied to the apparatus and view information of the program applied to the apparatus in a state where the setup information is applied to the apparatus, and causes the information processing apparatus to store the setup information and the program view information while associating the setup information with the program view information, wherein the acquiring the setup information acquires, in a case where the program is installed or uninstalled, the setup information, which is stored in association with the program view information in a state after the installing or the uninstalling the program, and wherein the applying applies the setup information acquired by the acquiring unit to the apparatus.

15. The non-transitory computer program product according to claim 14, wherein the sending sends a machine type name of the apparatus, the setup information applied to the apparatus, which is applied to the apparatus, and the program view information installed on the apparatus in a state where the setup information is applied to the apparatus to the information processing apparatus, and causes the information processing apparatus to store the machine type name, the setup information, the program view information while associating the machine type name and the setup information with the program view information, and wherein the acquiring the setup information acquires, in a case where the program is installed or uninstalled, the setup information stored in association with the program view information of the program installed on the apparatus after the installing or the uninstalling of the program and the machine type name of the apparatus from the information processing apparatus.

\* \* \* \* \*